United States Patent
Kanderski

(10) Patent No.: US 7,838,590 B2
(45) Date of Patent: *Nov. 23, 2010

(54) HOT MELT ADHESIVE BASED ON STYRENE-ETHYLENE-ETHYLENE-PROPYLENE-STYRENE COPOLYMER

(75) Inventor: Monina Kanderski, Milwaukee, WI (US)

(73) Assignee: Bostik, Inc., Wauwatosa, WI (US)

(*) Notice: Subject to any disclaimer, the term of this patent is extended or adjusted under 35 U.S.C. 154(b) by 537 days.

This patent is subject to a terminal disclaimer.

(21) Appl. No.: 11/760,447

(22) Filed: Jun. 8, 2007

(65) Prior Publication Data

US 2008/0306214 A1  Dec. 11, 2008

(51) Int. Cl.
| | |
|---|---|
| *B32B 27/22* | (2006.01) |
| *C08L 33/06* | (2006.01) |
| *C08L 53/00* | (2006.01) |
| *C08L 87/00* | (2006.01) |
| *C08K 5/01* | (2006.01) |

(52) U.S. Cl. .................. 524/578; 428/516; 524/505; 524/560; 525/92 R; 525/93

(58) Field of Classification Search .................. None
See application file for complete search history.

(56) References Cited

U.S. PATENT DOCUMENTS

| | | | |
|---|---|---|---|
| 5,863,977 A | 1/1999 | Fischer et al. | |
| 5,912,295 A | 6/1999 | Oeltjen et al. | |
| 6,197,845 B1 | 3/2001 | Janssen et al. | |
| 6,465,557 B1 | 10/2002 | De Keyzer et al. | |
| 6,767,424 B1 * | 7/2004 | Butterbach et al. | .......... 156/245 |
| 2007/0088116 A1 | 4/2007 | Abba et al. | |

FOREIGN PATENT DOCUMENTS

| | | | |
|---|---|---|---|
| EP | 1700895 | | 9/2006 |
| JP | 2000-219860 | | 8/2000 |
| JP | 2004-75842 A | * | 3/2004 |

* cited by examiner

*Primary Examiner*—Robert Sellers
(74) *Attorney, Agent, or Firm*—Andrus, Sceales, Starke & Sawall, LLP

(57) ABSTRACT

A hot melt adhesive composition, comprising a blend of components including about 1% to about 20% by weight of a styrene-ethylene-ethylene-propylene-styrene (SEEPS) random block copolymer; about 10% to about 70% by weight of a first midblock tackifying resin having a softening point of at least about 85° C.; about 0 to 65% of a second midblock tackifying resin; about 5% to about 60% by weight of a plasticizer; about 0% to about 20% by weight of an end block reinforcing resin having a softening point equal to or higher than 115° C.; and about 0.1% to about 5% of a stabilizer; wherein the components total 100% by weight of the composition, and the viscosity of the composition is equal to or less than about 20,000 mPa.s at 160° C. Laminates, especially those used in disposable soft goods, and methods of making such laminates using the hot melt adhesive composition are also described. The adhesive composition and/or laminate may be used in making a variety of end products such as a disposable diaper, a sanitary napkin, a bed pad, a bandage, a surgical drape, a tape, a label, a plastic sheet, a nonwoven sheet, a paper sheet, a cardboard, a book, a filter, or a package.

24 Claims, No Drawings

HOT MELT ADHESIVE BASED ON STYRENE-ETHYLENE-ETHYLENE-PROPYLENE-STYRENE COPOLYMER

BACKGROUND OF THE INVENTION

The present invention relates to hot melt adhesives, and more particularly to a hot melt adhesive using a high molecular weight styrene-ethylene-ethylene-propylene-styrene copolymer (SEEPS) to provide high initial bond resistance for making elastic components such as laminates containing elastic strands for use in disposable diapers.

The increasing complexity of manufactured goods, in particular disposable goods, also leads to major improvements and developments in the hot melt adhesive industry. Hot melt adhesives are being used to bond a wider variety of substrates, within a broader adhesive application process window, and for a large end-use portfolio. For example considering the diaper manufacturing industry, materials involved may be non-woven materials, polymeric films, and in general elastomeric components. These elastomeric components can be used in products like diapers, in a form of strands, films, nonwovens or any other continuous or discrete form.

Processability of hot melt adhesive is linked to their ability to be melted, and transported and/or coated in a molten stage to the final location where the bond is required. Usually the molten adhesive is sprayed, or coated as a film. Once cooled down, the adhesive needs to fulfill multiple requirements, like bond strength measured by peel force or bond retention under or after mechanical stress, and under or after various thermal conditions.

Typically hot melt adhesives can be based on polymers such as polyolefins (ethylene- or propene-based polymers), or functionalized polyolefins (ethylene or propene copolymers with oxygenated function containing monomers), or styrene block copolymers containing at least one rubbery phase, like SIS, or SBS. Styrene block copolymers are of interest due to their dual characteristics, i.e. cohesion of the styrenic phase associated with the rubber behavior of another phase. Typical application temperatures are equal to or higher than 150° C.

Combining parameters in the areas of a substrate's nature, adhesive processability and a product's end use requirements, there has been a steady trend in the industry to change and use more sophisticated substrate types, for technical or economical reasons. This can lead to the use of more sensitive substrate materials, in terms of mechanical, thermal, weather or time resistance, with the need to not compromise any of the other attributes, i.e. the overall manufacturing process should remain of the same concept, and the end use of the item should be fulfilled in the same way, or enhanced. For example in the diaper industry, typical application temperatures for elastic attachment would be around 163° C. Depending on the bonding performances required, however, it may be higher. Lowering the application temperature presents problems in terms of wet-out, and most of the time 150° C. would be seen as a minimum temperature one can go to attach elastic parts onto the diaper structure.

It is known in the diaper industry that the use of heat sensitive substrates may cause problems if the adhesive temperature is too high because the production line has to be stopped each time the substrate breaks or is damaged by the molten adhesive material (described as a "burn through" phenomenon) and would need to be replaced or fixed before starting the line again. This may also be the case with non-woven substrates or with elastomeric components used in the diaper structure. Thus, a lower application temperature of the hot melt adhesive would be very helpful to avoid maintenance issues and downtime on production lines.

Another factor making it desirable to reduce the application temperatures of hot melt adhesives is that the diaper industry has been trying to use thinner gauge films in order to decrease the overall diaper's material weight, and consequently the material cost. Over the years, this has been achieved with more or less success, depending on the difficulty to keep both the manufacturing process and end-use attributes the same. Heat distortion or deterioration of the film or non-woven substrates can occur easily when the hot adhesive material contacts the substrates' surfaces. As a result, the functionality of the substrates in the end-use structure is affected in a way that is not acceptable. Among other reasons to decrease the application temperature of the hot melt adhesives is the concern of saving some energy cost needed to heat the adhesive material, as well as the need to enhance safety for the workers on the production line to minimize potential burn hazards.

Many references offer possible solutions to apply a hot melt adhesive material at low temperature. Lowering material viscosity is very often seen as the only criterion to lower the application temperature. Both lack of cohesion and incompatibility of composition ingredients, however, have hindered solving this problem in the manner in which the present invention proposes to solve the problem.

It has to be noted that the phrase "low application temperature hot melt adhesive" as used herein corresponds to the ability to apply the molten or deformable adhesive material at a relatively low process temperature, or "application temperature", i.e. less than 150° C., in order to build a bond between two substrates.

Adhesive application at low temperature is relatively easily achieved for specific applications or application domains where there is no stringent cohesion required. Although focus could be put on Shear Adhesion Failure Temperature (SAFT) value, the aim of this test is more in defining a failure under a constantly increasing temperature than reflecting the mechanical resistance of the bond over time. Many references exhibit interesting SAFT values that do not correlate with the ability of the adhesive materials to resist creep conditions over an extended period of more than few minutes at elevated temperature.

Numerous references claim the concept of applying an adhesive at low temperature, with a certain lack of precision, i.e. they do not precisely define the temperature domain, or they do not give a clear way of how to practically achieve the low temperature application.

Aromatic resins, including pure monomer resins, are commonly used raw materials to formulate hot melt adhesives, those being PSA or not. The softening point of these materials is typically between 5° C. and 160° C., and their presence in the formulas can be driven by the level of tack and of adhesion required, as well as by the need to reinforce the styrenic phase of any styrenic block copolymer. Reinforcing resins help to provide a higher cohesion to the adhesive bond, at room temperature as well as at elevated temperature.

Finally, no mention or preference is made for the softening point value of the cited tackifying resins, both mid-block resins and end-block resins. Softening point of such tackifying resins is an essential characteristic of these ingredients in regard to low application temperature and is a key parameter for the present invention. These three last points show that the information disclosed in this reference is unable to teach one skilled in this art anything that would bring any relevance to the present invention.

There are a number of prior art patents that discuss the use of other saturated mid-block styrenic block copolymer for use in hot melt adhesives. The block copolymers include styrene-ethylene/butylene-styrene, styrene-ethylene/propylene-styrene triblock copolymers, and styrene-ethylene/propylene diblock copolymers. These polymers are all different than the styrene-ethylene-ethylene/propylene-styrene block copolymers used as the primary polymer ingredient in the adhesive formulations of the present invention.

U.S. Pat. No. 5,863,977 discloses the use of substantially linear, high molecular weight saturated mid-block polymers to produce hot melt adhesives. The mid-block is further defined as ethylene/butylenes, ethylene/propylene or mixtures thereof. This patent is absent any teaching on any critical aspects (chemistry, molecular weight, softening point, etc.) of the tackifying resin used in the adhesive. Further, it does not contemplate the use of SEEPS block copolymers or an aromatic reinforcing resin.

U.S. Pat. No. 5,912,295 discloses a removeable hot melt pressure sensitive adhesive having 5 to 30% of a block copolymer having styrene endblocks and ethylene/butylenes or ethylene/propylene midblocks and having a diblock content of greater than about 35% and a melt index of greater than about 20 grams/10 minutes.

U.S. Pat. No. 6,197,845 discloses articles using hot melt adhesives for adherence to skin. The adhesives used therein comprises block copolymers having styrenic endblocks and a midblocks comprising ethylene/butylene, ethylene/propylene and mixtures thereof. However, it does not contemplate the use of SEEPS block copolymer or an aromatic reinforcing resin.

U.S. Pat. No. 6,465,557 discloses a hot melt pressure sensitive positioning adhesive for use with an absorbent article. The adhesive comprises from 6 to 15 percent of a hydrogenated styrene-(butadiene and/or isoprene)-styrene block copolymer having a vinyl content of greater than 50%, from 50 to 80 percent of a tackifying resin which has an aromaticity such that the MMAP cloud point is at least 45 degrees Celsius and from 5 to 35 percent plasticizer. No other end uses are contemplated in this patent. The MMAP cloud point restriction in this patent excludes the use of aromatic resins that are useful in the present invention. In addition, the polymers used in the present invention have very low vinyl contents (preferably less than 10 percent).

EP 1700895 A1 discloses a peelable hot melt adhesive for automotive applications. The formulations shown in this patent all comprise blends of SEEPS and SEP diblock polymers in combination with calcium carbonate. The filler content in combination with the high viscosity of the finished adhesive (greater than 15,000 centipoise at 180° C.) would result in hot melts that would not be suited for spray applications of any kind. The adhesives of the present invention are designed to be low viscosity, non-filled, non-peelable, sprayable hot melt adhesives.

Japanese Patent Abstract 2000-219860 issued to Kuraray describes low molecular weight hydrogenated block copolymers that can be used to make pressure sensitive hot melt adhesives. The number average (Mn) molecular weight of the polymers described range from 93,000 to 114,000. These low molecular weights require high polymer loadings to give acceptable strength and viscosity. By contrast, the polymers in the instant invention are substantially higher in molecular weight.

None of the cited references claims any specific resin features based on composition, aromatic/aliphatic balance and softening point level to reach the right adhesion performances as described and claimed in the present invention. There is no relevance to be found in them according to the solution that the present invention has developed.

SUMMARY OF THE INVENTION

The present invention is based on a unique formulation using a high molecular weight styrene-ethylene-ethylene-propylene-styrene (SEEPS) block copolymer, particularly for elastic attachment into diaper structures. The present invention solves the very important requirement of having a hot melt adhesive applied at relatively low application temperature, i.e. under 170° C., using the same application techniques as currently used, like coating techniques and add-on levels, and providing the end-use application the same level of performances expected with the current technologies, i.e. high bond strength levels in term of creep resistance, peel force and in general bond retention with mechanical resistance and heat resistance. In addition, the high molecular weight grades of SEEPS allows for higher oil loading in the formulation which provides potential cost savings. Also, SEEPS has a relatively low $T_g$ compared to other polymers, such as SEBS, which allows higher loading of a mid-block resin. Finally, SEEPS is thermally stable at elevated temperatures.

Various methods are conventionally used to coat a hot melt adhesive at fairly low viscosity on a substrate. This can be made by roll coating or any printing type method, or by slot coating, by extrusion or by spray gun. Spray gun techniques are numerous and can be done with or without assistance of compressed air that would shape the adhesive spray, and consequently the adhesive pattern. The hot melt adhesive material is generally allowed to melt in tanks, and then pumped through hoses to the final coating spot on the substrates. For the present invention, preferred methods of applying the adhesive would be by spray application, most preferably assisted by air. Among these techniques, the most common are spiral spray (Controlled Fiberization™ by Nordson), Summit™ by Nordson, Surewrap™ by Nordson, Omega™ by ITW, Curtain Coating™ by Nordson and various melt blown processes.

For the present invention, the temperature at which the hot melt adhesive is applied should be below 170° C., so that the heat sensitive substrates would not be damaged. Preferably, this temperature should be equal to or lower than 150° C., most preferably lower than 135° C.

Also, the viscosity (as measured via ASTM D3236-88) of the adhesive material needs to be generally lower than 20,000 mPa·s, more preferably lower than 15,000 mPa·s, most preferably lower than 12,000 mPa·s measured at 160° C. An adhesive with such low viscosity is needed to be operated through standard hot melt adhesive equipment and to achieve the right pattern and consequently the right bonding performance at the application temperature.

The adhesive of the present invention can be used with any process of conventional or non-conventional elastic attachment technology as known in the state of the art.

The adhesive of the present invention can be used with any application where various substrate materials are involved like non-woven materials, polymeric films, and in general elastomeric components put in items like diapers, in the form of strands, films, nonwovens or any other continuous or discrete form. Any substrate material and any substrate form could be used in any combination possible, the adhesive allowing to bond two or more substrates together. The substrates can be of multiple forms for example fiber, film, thread, strip, ribbon, coating, foil, sheet, and band. The substrate can be of any known composition for example polyolefin, polyacrylic, polyester, polyvinyl chloride, polystyrene, cellulosic like wood, cardboard and paper, or made out of mineral compounds like concrete, glass or ceramics. The substrate's mechanical behavior can be rigid, plastic or elastomeric. Among elastomeric material are various examples like natural or synthetic rubber, polyurethane based copolymers, polyether or polyester urethanes, block copolymers of styrene or of amides, or olefinic copolymers. The above lists are not limitative or all-inclusive, but are only provided as common examples. In the present invention, various methods to process hot melt adhesives can be employed, linked to their ability to be melted, and transported and/or coated or sprayed in a molten stage to the final location where the bond is required.

The adhesive of the present invention can also be used with any application where composites and disposable products are made with the help of bonding parts together with a hot melt adhesive used at a temperature lower than 170° C., preferably equal to or lower than 150° C., most preferably lower than 135° C., while obtaining adequate cohesion from the adhesive bond to withstand mechanical stress at low, ambient or elevated temperature, in particular under creep conditions. Diaper, adult incontinence products, sanitary napkins and other absorbent disposable products are envisioned applications for the adhesive composition of the invention, as well as bed pads, absorbing pads, surgical drapes and other related medical or surgical devices. Construction applications, structural applications or packaging applications, in particular disposable items packaging and food packaging, can also be applications where the invention is useful. The most specific application of the present hot melt adhesive is for elastic attachment, wherein the present invention allows bonding of elastic strands on film substrates while applying the adhesive at a temperature lower than 170° C., preferably equal to or lower than 150° C., most preferably lower than 135° C.

Good performance for elastic attachment in a diaper application is typically when the bond retention is either more than 60%, preferably more than 70%, more preferably more than 75%, most preferably more than 80% in a specific test described hereinafter when it is done within 2 days after adhesive has been applied on substrates (initial creep test), or more than 50%, preferably more than 60%, most preferably more than 70%, when it is done after a storage time of one week at 54° C. (one-week-aged creep test). These tests are indicative of what level of adhesion and creep resistance (or bond retention) can be achieved by an adhesive. Because of economics involved in production and in material cost, preferred adhesive add-ons are lower than 18 gsm (grams of adhesive material per square meter of substrate covered by the adhesive material), more preferably equal to or lower than 15 gsm, and most preferably equal to or lower than 12 gsm.

Accordingly, the present invention provides a hot melt adhesive composition, comprising a blend of the following components:

about 1% to about 20%, preferably about 4% to about 15%, and most preferably about 5% to about 13%, by weight, of a styrene based copolymer, namely, a styrene-ethylene-ethylene-propylene-styrene (SEEPS) block copolymer;

about 10% to about 70%, preferably about 40% to about 65%, and most preferably about 50% to about 60%, by weight, of a first midblock tackifying resin having a softening point of at least about 85° C.;

about 0 to about 65% of second midblock tackifing resin that is different than the first midblock tackifying resin;

about 5% to about 60%, preferably about 15% to about 55%, more preferably about 20% to about 50%, by weight, of a plasticizer;

about 0% to about 20%, preferably about 2% to about 15%, more preferable about 4% to about 12%, and most preferably about 6% to about 10%, by weight of an end block reinforcing resin having a softening point equal to or greater than 115° C.;

about 0.1% to about 5% of a stabilizer or antioxidant; and optionally, about 1% to about 10% by weight of a second block copolymer selected from the group consisting of SB, SIBS, SEBS, SEP, SEPS, SBBS and blends thereof.

wherein the components total 100% by weight of the composition, the viscosity of the composition is equal to or less than about 20,000 mnPa·s at 160° C., and is applied at a temperature lower than 170° C., and initial bond retention of the composition on elastic strands is at least about 60%.

Although the primary polymer component in the present adhesive composition is SEEPS, blends containing about 1% to about 5% by weight of SB, SIBS, SEBS, SEP, SEPS, SBBS, and blends thereof, may also be used. However, it has been discovered that blends of SEEPS with SIS, SBS, EVA and APAO are incompatible, and thus such mixtures should be avoided, for elastic attachment applications.

The present invention also provides a laminate comprising a first layer of nonwoven material, a second layer of nonwoven material, and one or a plurality of elastomeric substrates, disposed between said first and second nonwoven layers, bonded together with the adhesive composition.

The laminate may also comprise a first layer of nonwoven material, a second layer of film material, and one or a plurality of elastomeric substrates disposed between said first and second layers, bonded together with the adhesive composition. The film material may comprise a polyethylene film, a polypropylene film, an ethylene-propylene copolymer film or a cloth-like coated film material, and the elastomeric substrate is preferably a plurality of elastic strands.

The laminate may further comprise a first layer of nonwoven material bonded to a second layer of film material with the adhesive composition, and without any elastomeric substrate therebetween.

The adhesive composition and/or laminate of the present invention may be used in making a variety of end products. Examples include a disposable diaper, a sanitary napkin, a bed pad, a bandage, a surgical drape, a tape, a label, a plastic sheet, a nonwoven sheet, a paper sheet, a cardboard, a book, a filter, or a package.

In yet another aspect, the present invention provides a method of making laminate comprising the steps of feeding a first substrate in a first direction; feeding a second substrate spaced from said first substrate in said first direction; applying the adhesive composition to one or both of said substrates; and compressing said substrates together to form the laminate.

When an elastomeric laminate is desired, the method includes the additional steps of feeding one or a plurality of elastomeric substrate or substrates between said first and second substrates in said first direction, said elastomeric substrates are stretched before, during or after adhesive application; and applying the adhesive composition to either said elastomeric substrate or substrates or one or both of said substrates before comprising the substrates together. The elastomeric substrate is preferably a plurality of elastic strands each stretched up to 500% from their initial relaxed state.

DETAILED DESCRIPTION OF THE INVENTION

A tackifying resin, as defined in the present description can be a molecule or a macro-molecule, generally a chemical compound or a fairly low molecular weight polymer, compared to common polymers, from a natural source or from a chemical process or combination thereof that in general enhances the adhesion of a final hot melt adhesive composition. The use of tackifying resins to impart adhesion needs to be assessed by using the same process conditions when applying the adhesive, in order to compare different resins to each other.

The hot melt adhesive compositions of the present invention also comprises a solid tackifier which is compatible with the midblock of the SEEPS copolymer. Representative resins include the $C_5/C_9$ hydrocarbon resins, synthetic polyterpenes, rosin, rosin esters, natural terpenes, and the like. More particularly, the useful tackifying resins include any compatible resins or mixtures thereof such as (1) natural and modified rosins including gum rosin, wood rosin, tall oil rosin, distilled rosin, hydrogenated rosin, dimerized rosin, and polymerized rosin; (2) glycerol and pentaerythritol esters of natural and modified rosins, including the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, such as styrene/terpene and alpha methyl styrene/terpene; (4) polyterpene resins generally resulting from the polymerization of terepene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof such, for example, as the resin product resulting from the condensation, in an acidic medium, of a bicyclic terpene and a phenol; (6) aliphatic petroleum hydrocarbon resins resulting from the polymerization of monomers consisting primarily of olefins and diolefins; also included are the hydrogenated aliphatic petroleum hydrocarbon resins; and (7) cyclic petroleum hydrocarbon resins and the hydrogenated derivatives thereof. Mixtures of two or more of the above described tackifying resins may be required for some formulations. Also included are the cyclic or acyclic $C_5$ resins and aromatic modified acyclic or cyclic resins. Preferred is an aromatic modified cyclic or an acyclic $C_5$ resin.

The tackifying resin should have a Ring and Ball softening point of at least about 85° C., and preferably between about 85° C. and about 125° C. More preferably the softening point is between about 95° C. and 115° C. A preferred tackifier is a hydrogenated aromatic modified dicyclopentadiene resin with a Ring and Ball softening point between about 100° C. to 115° C. These resins are available from ExxonMobil Chemical Company under the tradenames Escorez 5600 and 5615, with softening points of 100° C. and 115° C., respectively.

The tackifiers, also referred to as "midblock resins", are generally present in the adhesive compositions in an amount greater than the amount of the block copolymer. Within this range, amounts of about 10 to 70% by weight of the composition, preferably about 40 to 65% by weight are utilized, and most preferably about 50 to 60% by weight. Blends of two or more tackifying resins may also be used. For example, a blend of a first midblock tackifying resin and a second midblock tackifying resin that is different than the first midblock tackifying resin may also be employed. From about 0% to about 60% by weight of one or more additional midblock tackifying resins may be blended together with the first midblock tackifying resin if desired.

The primary polymer component used in a hot melt adhesive formula according to the present invention is a styrene-ethylene-ethylene-propylene-styrene random block copolymer (SEEPS). The SEEPS copolymer may be incorporated into the composition in amounts of from about 1% to about 20% by weight, preferably from about 4% to about 15% by weight, and most preferably from about 5% to about 13% by weight. SEEPS is a hydrogenated poly (styrene-b-isoprene/butadiene-b-styrene) random block copolymer. It has the general formula:

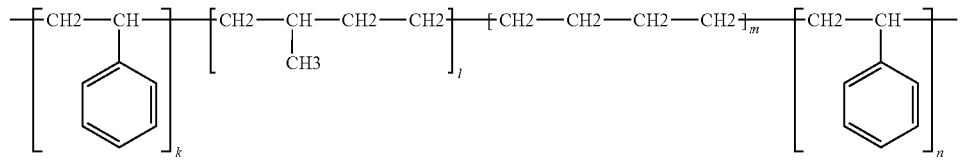

The SEEPS polymer useful in the hot melt adhesive of the present invention has a weight average molecular weight (Mw) of greater than or equal to 140,000 Daltons, preferably greater than or equal to 160,000 Daltons, and most preferably greater than or equal to 180,000 Daltons. SEEPS is commercially available from Septon Company of America in different grades which are distinguishable primarily based on their molecular weight as follows:

| SEEPS | Mw (Daltons) | Mn (Daltons) | % Styrene | Specific Gravity |
|---|---|---|---|---|
| S4044 | 185,874 | 108,764 | 32% | 0.91 |
| S4055 | 315,624 | 299,840 | 30% | 0.91 |
| S4077 | 364,503 | 346,434 | 30% | 0.91 |

The molecular weights for the SEEPS polymers were determined by GPC. GPC (Gel Permeation Chromatography) is a chromatographic method that measures the molecular weight and molecular weight distribution (Mz, Mw, and Mn) by comparing a polymer sample to known polystyrene standards. The method used is similar to ASTM D5296-05. Mz (z—average molecular weight) is the value that indicates the high molecular weight tail of the polymer. Mw (weight average molecular weight) indicates the average molecular weight of the polymer. Mn (number average molecular weight) indicates the lower molecular weight of the polymer.

Blends of two or more SEEPS polymers may also be used. For example, a blend of a first SEEPS polymer and a second SEEPS polymer that is different than the first SEEPS polymer may be employed.

Although SEEPS is the primary polymer component, blends of SEEPS with about 1% to about 5% by weight of another elastomeric block copolymer may also be used. Among the useful elastomeric block copolymers are those having structure A-B, A-B-A, A-(B-A)$_n$-B, or (A-B)$_n$-Y wherein A comprises a polyvinyl aromatic block having a Tg higher than 80° C., B comprises a rubbery midblock having a Tg lower than −10° C., Y comprises a multivalent compound, and n is an integer of at least 3. Examples of these latter block copolymers that may be used with SEEPS in hot melt adhesive compositions are styrenic block copolymers (SBc) and include styrene-butadiene (SB), styrene-isoprene (SI), styrene-isoprene-butadiene-styrene (SIBS), styrene-ethylene-butylene-styrene (SEBS), styrene-ethylene-butylene (SEB) styrene-ethylene propylene-styrene (SEPS) and styrene-ethylene propylene (SEP). While the total styrene content of the polymers can be as much as 51 wt- % of the polymer, and since the polymers can have more than two A blocks for optimal performance, the total A block should be less than or equal to about 45 wt- % of the polymers, and, most preferably, is less than or equal to 35 wt- % of the polymer. Hydrogenating the butadiene midblocks produces rubbery midblocks that are typically converted to ethylene-butylene midblocks. Such block copolymers are available for example from Kraton Polymers, Polimeri Europa, Total Petrochemicals, Dexco, and Kuraray. Multiblock or tapered block copolymers (the A-(B-A)$_n$-B type) are available from Firestone. Block copolymers structures can contain any acrylic monomers or acrylic phase in general, either presenting a high Tg like methyl methacrylate, or having an elastomeric behavior like butyl acrylate. Also, the polymer fraction of the hot melt adhesive can contain one or more other phases, can contain more than one structure or can contain other polymers like copolymers of ethene, propene or other olefinic monomer, or like copolymerization of acrylic monomers. These additional polymers can be homopolymers, or copolymers and can be potentially modified by any during- or after-polymerization modification like grafting or chain-scission. Blends of various polymers may also be employed so long as the composition retains the desired viscosity, creep resistance and low temperature application characteristics of the present invention.

Hot melt adhesive formulas according to the present invention also contain about 5% to about 60%, preferably about 15% to about 55%, and more preferably about 20% to about 50%, by weight, of any plasticizer. A suitable plasticizer may be selected from the group which not only includes the usual plasticizing oils, such as mineral oil, but also olefin oligomers and low molecular weight polymers, glycol benzoates, as well as vegetable and animal oil and derivatives of such oils. The petroleum-derived oils that may be employed are relatively high boiling temperature materials containing only a minor proportion of aromatic hydrocarbons. In this regard, the aromatic hydrocarbons should preferably be less than 30%, and more particularly less than 15%, by weight, of the oil. Alternately, the oil may be totally non-aromatic. The oligomers may be polypropylenes, polybutenes, hydrogenated polyisoprene, hydrogenated butadiene, or the like having average molecular weights between about 100 and about 10,000 g/mol. Suitable vegetable and animal oils include glycerol esters of the usual fatty acids and polymerization products thereof. Other plasticizers may be used provided they have suitable compatibility. Nyflex 222B, a naphthenic mineral oil manufactured by Nynas Corporation, has also been found to be an appropriate plasticizer. As will be appreciated, plasticizers have typically been employed to lower the viscosity of the overall adhesive composition without substantially decreasing the adhesive strength and/or the service temperature of the adhesive. The choice of plasticizer can be useful in formulation for specific end uses (such as wet strength core applications). Because of economics involved in production and in material cost, as plasticizers are usually of lower cost than other materials involved in the formulation like polymers and tackifying resins, the amount of plasticizer in the adhesive should be maximized for cost considerations.

Waxes can also be used in the adhesive composition, and are used to reduce the melt viscosity of the hot melt construction adhesives without appreciably decreasing their adhesive bonding characteristics. These waxes also are used to reduce the open time of the composition without affecting the temperature performance.

The wax material component of the adhesive is optional but when included may comprise up to about 25% by weight of the adhesive composition.

Among the useful wax materials are:

(1) Low molecular weight, that is, 100-6000 g/mol, polyethylene having a hardness value, as determined by ASTM method D-1321, of from about 0.1 to 120 and ASTM softening points of from about 66° C.° to 120° C.;

(2) Petroleum waxes such as paraffin wax having a melting point of from about 130° to 170° F. and microcrystalline wax having a melting point of from about 135° to 200° F., the latter melting points being determined by ASTM method D127-60;

(3) atactic polypropylene having a Ring and Ball softening point of from about 120° to 160° C.;

(4) metallocene catalyzed propylene-based wax like those commercialized by Clariant under the name "Licocene".

(5) metallocene catalyzed wax or single-site catalyzed wax like for example those described in U.S. Pat. Nos. 4,914,253, 6,319,979 or WO 97/33921 or WO 98/03603.

(6) synthetic waxes made by polymerizing carbon monoxide and hydrogen such as Fischer-Tropsch wax; and (7) polyolefin waxes. As used herein, the term "polyolefin wax" refers to those polymeric or long-chain entities comprised of olefinic monomer units. These materials are commercially available from Eastman Chemical Co. under the trade name "Epolene." The materials which are preferred to use in the compositions of the present invention have a Ring and Ball softening point of 200° F. to 350° F. As should be understood, each of these waxes is solid at room temperature. Other useful substances include hydrogenated animal, fish and vegetable fats and oils such as hydrogenated tallow, lard, soy oil, cottonseed oil, castor oil, menhadin oil, cod liver oil, etc., and which are solid at ambient temperature by virtue of their being hydrogenated, have also been found to be useful with respect to functioning as a wax material equivalent. These hydrogenated materials are often referred to in the adhesives industry as "animal or vegetable waxes".

The preferred wax material is a paraffin wax having a melting point of 60° C. to 70° C., a hard wax such as Paraflint H1 commercialized by Sasol-Schuman, or Bareco PX 100 commercialized by Bareco, those hard waxes having a penetration hardness at 23° C. of about 2 dmm or less and a melting point of 75° C. to 120° C., or blends of a paraffin wax and a hard wax. The preferred hard wax has a melting point lower than 95° C. The term "hard wax" refers to any low molecular weight, highly crystalline ethylene-based polymer.

The adhesive also typically includes about 0.1% to about 5% of a stabilizer or antioxidant. The stabilizers which are useful in the hot melt adhesive compositions of the present invention are incorporated to help protect the polymers noted above, and thereby the total adhesive system, from the effects of thermal and oxidative degradation which normally occurs during the manufacture and application of the adhesive as well as in the ordinary exposure of the final product to the ambient environment. Such degradation is usually manifested by a deterioration in the appearance, physical properties and performance characteristics of the adhesive. A particularly preferred antioxidant is Irganox 1010, a tetrakis (methylene(3,5-di-teri-butyl-4-hydroxyhydrocinnamate))

methane manufactured by Ciba-Geigy. Among the applicable stabilizers are high molecular weight hindered phenols and multifunctional phenols, such as sulfur and phosphorus-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5-trimethyl-2,4,6-tris(3-5-di-tert-butyl-4-hydroxybenzyl) benzene;

pentaerythritol tetrakis-3(3,5-di-tert-butyl-4-hydroxyphenyl) propionate;

n-octadecyl-3(3,5-ditert-butyl-4-hydroxyphenyl) propionate;

4,4'-methylenebis(4-methyl-6-tert butylphenol);

4,4'-thiobis(6-tert-butyl-o-cresol);

2,6-di-tert-butylphenol;

6-(4-hydroxyphenoxy)-2,4-bis(n-ocytlthio)-1,3,5-triazine;

2,4,6-tris(4-hydroxy-3,5-di-tert-butyl-phenoxy)-1,3,5-triazine;

di-n-octadecyl-3,5-di-tert-butyl-4-hydroxybenzylphosphonate;

2-(n-octylthio)ethyl-3,5-di-tert-butyl-4-hydroxybenzoate; and sorbitol hexa-(3,3,5-di-tert-butyl-4-hydroxy-phenyl) propionate.

The performance of these stabilizers may be further enhanced by utilizing, in conjunction therewith; (1) synergists such as, for example, as thiodipropionate esters and phosphites; and (2) chelating agents and metal deactivators as, for example, ethylenediaminetetraacetic acid, salts thereof, and disalicylalpropylenediimine.

The adhesive composition useful in the method of the present invention may be produced using any of the techniques known in the art. A representative example of the procedure involves placing all of the substances, in a jacketed mixing kettle, and preferably in a jacketed heavy duty mixer of the Baker-Perkins or Day type, and which is equipped with rotors, and thereafter raising the temperature of this mixture to a range of 120° C. to 177° C. It should be understood that the precise temperature to be used in this step would depend on the melting point of the particular ingredients. The resulting adhesive composition is agitated until the polymers completely dissolve. A vacuum is then applied to remove any entrapped air.

Optional additives may be incorporated into the adhesive composition in order to modify particular physical properties. These additives may include colorants, such as titanium dioxide and fillers such as talc and clay, crosslinking agents, nucleating agents, reactive compounds, fire-retardant mineral or organic agents, as well as ultraviolet light (UV) absorbing agents and UV fluorescing agents.

In another embodiment, the adhesive formula may contain a fully aromatic or a substantially fully aromatic endblock reinforcing resin. The aromatic or substantially fully aromatic resin should have softening point equal to or higher than 115° C. Examples of such endblock resins can be prepared from any substantially aromatic monomers having a polymerizable unsaturated group. Typical examples of such aromatic monomers include the styrenic monomers, styrene, alphamethyl styrene, vinyl toluene, methoxy styrene, tertiary butyl styrene, chlorostyrene, etc., coumarone, indene monomers including indene, and methyl indene. The Ring and Ball Softening Points of the aromatic endblock resin is preferably between 115° and 160° C. More preferably, the softening point is between about 115° and 140° C. and most preferably between about 120° C. and 140° C. Two preferred examples are Plastolyn 240 and Plastolyn 290 available from Eastman chemical. They have Ring and Ball Softening Points of 120° C. and 140° C., respectively. Preferably, styrene and/or alphamethyl-styrene and/or vinyl-toluene monomers used. This reinforcing resin should be present in amounts under about 20% in the adhesive composition, preferably between about 2% to about 15%, more preferably about 4% to about 12%, and most preferably about 6% to about 10%.

Various methods are conventionally used to coat a hot melt adhesive at fairly low viscosity on a substrate. This can be made by roll coating or any printing type method, or by slot coating, by extrusion or by spray gun. Spray gun techniques are numerous and can be done with or without assistance of compressed air that would shape the adhesive spray, and consequently the adhesive pattern. The hot melt adhesive material is generally allowed to melt in tanks, and then pumped through hoses to the final coating spot on the substrates.

For the present invention, preferred methods of applying the adhesive would be by spray application, most preferably assisted by heated air. Among these techniques, the most common are spiral spray (Controlled Fiberization™ by Nordson), Summit™ by Nordson, Surewrap™ by Nordson, Omega™ by ITW, Curtain Coating™ by Nordson and melt blown process. For the present invention, the temperature at which the hot melt adhesive is applied should be below 170° C., so that the heat sensitive substrates will not be damaged. Preferably, this temperature should be equal to or lower than 160° C., most preferably lower than 150° C.

The viscosity (as measured via ASTM D3236-88) of the adhesive material needs to be generally lower than 20,000 mPa·s, more preferably lower than 15,000 mPa·s, most preferably lower than 12,000 mPa·s at 160° C. in order to achieve the right pattern and consequently the right bonding performances. Line speed, add-on levels as well as open time, set time, compression forces and compression time are also process control parameters.

Taking the example of bonding elastic strands in the environment of a diaper manufacturing process, typical conditions are very stringent regarding the adhesive features. The adhesive is typically sprayed either on a polymeric film (usually ethylene based or propylene based under 40 gsm of basis weight), or on elastic strands stretched at up to about 500% from their initial relaxed state, and preferably at about 300% elongation. Film and elastic strands are put in contact together, before, during or after the adhesive spray. The film together with the stretched elastic strands are then laminated to a non-woven web of low basis weight (under 50 gsm). In fact, the primary substrate can also be a non-woven web, and can be the same as the secondary web substrate, when this web is simply sprayed with adhesive and then folded over the elastic strands. Plastic films can have various features like breathability, color, printing, stretchiness, embossing, or surface treatments, for example to favor adhesion from adhesives or inks. Elastic strands can be made of natural or synthetic rubber, of specialty polyurethane formulations, and can be in a strip form, or in a multifilament form. More specifically elastic strands for diaper construction are usually made of polyester polyurethane microfilaments bonded together to get the right elastomeric strength, like Lycra™ or Lycra XA™ from Invista, or narrow bands made of natural or synthetic rubber narrow bands like Fulflex™, from Fulflex Elastomerics.

Line speeds can be as high as 700 feet per minute or higher, open times are typically around 0.2 second, and can be considered to be the same as compression time. Set time is considered as immediate or negligible, as compression into nip rolls is usually helping the adhesive material to set. Add-on levels vary according to applications and to the required level of bond strength, from a few gsm of adhesive, on a localized area where the elastic strands need to be bonded. The viscosity of the adhesives of the present invention is lower than 20,000 mPa·s at 160° C. Preferably, it should be lower than 15,000 mPa·s, more preferably below 12,000 mpa·s, as determined by employing a Brookfield Thermocel or other appropriate viscometer and utilizing the testing techniques which are set forth in ASTM Method D3236-88.

The present invention thus encompasses any process of conventional or non-conventional elastic attachment technology as known in the state of the art. The present invention also encompasses any application where various materials can be involved like non-woven materials, polymeric films, and in general elastomeric components put in items like diapers, in a form of strands, films, nonwovens or any other continuous or discrete form. Any substrate material and any substrate form could be used in any combination possible, the adhesive allowing to bond two or more substrates together. Form of substrates can be for example fiber, film, thread, strip, ribbon, coating, foil, sheet, and band. Material of substrate can be a polyolefin, a polyacrylic, a polyester, a polyvinyl chloride, a polystyrene, or a cellulosic like wood, cardboard and paper, The substrate's mechanical behavior can be rigid, plastic or elastomeric. Among elastomeric materials are various examples like natural or synthetic rubber, polyurethane based copolymers, polyether or polyester urethanes, block copolymers of styrene or of amides, or olefinic copolymers. The above list is not limitative, but is only meant to describe examples of what the present invention may encompass.

The present invention encompasses any application where laminates, composites and disposable products are made with the help of bonding parts together with a hot melt adhesive used at a temperature lower than 170° C., preferably equal to or lower than 160° C., most preferably lower than 150° C., while obtaining good cohesion from the adhesive bond to withstand mechanical stress at low, ambient or elevated temperature, in particular under creep conditions. Diapers, adult incontinence products, sanitary napkins and other absorbent disposable products can be envisioned applications for the invention, as well as bed pads, absorbing pads, surgical drapes and other related medical or surgical devices. Construction applications, structural applications or packaging applications, in particular disposable items packaging and food packaging can be applications where the invention is useful. Specifically for elastic attachment, the present invention allows bonding of the elastic strands on film substrates while applying the adhesive at a temperature lower than 170° C., preferably equal to or lower than 160° C., most preferably lower than 150° C. Bonding strength is measured primarily by testing the bond under a specific creep configuration, giving a model of the constraints encountered in a real life cycle of a disposable diaper, where baby movements are stretching the laminates at room temperature or body temperature. Creep test methods can vary among the industry, and the Applicant has developed over the years its own test method that satisfies the majority of the applications seen in the field, and, more important, that can compare and differentiate adhesives from each other, determining if one adhesive is suitable or not for an efficient elastic attachment function, once this adhesive has been coated to form a laminated structure. The creep test can be performed within the first days following the coating operation, and can be performed after a few days or few weeks at elevated temperature, to simulate the effects of ageing under storage and shipping conditions.

Good performance for elastic attachment in a diaper application is typically when the initial bond retention is either more than 60%, preferably more than 70%, more preferably more than 75%, most preferably more than 80% when the creep test is performed within 2 days after adhesive has been applied on substrates (initial creep test), or more than 50%, preferably more than 60%, most preferably more than 70%, when it is done after a storage time of one week at 54° C. (one-week-aged creep test). These conditions are indicative of the level of adhesion and bond retention under creep conditions that can be achieved. These conditions depend on the adhesive application technique used, like spiral spray or Surewrap® for example; on the level of adhesive add-on; on process parameters like air pressure, line speed, and adhesive temperature. Because of economics involved in production and in material cost, preferred adhesive add-ons are lower than 18 gsm, more preferably equal to or lower than 15 gsm, most preferably equal to or lower than 12 gsm.

EXAMPLES

Hot melt adhesive were prepared with the ingredients and mixing procedures described herein below. A total of 2000 grams each were made and the mixing was carried out at about 150° C. to 190° C. under carbon dioxide atmosphere in a laboratory type mixer that consists of a propeller powered by a motor, a heating mantle, a temperature control unit and a container of about 1 gallon in size. The appropriate amounts of each component, calculated according to the ratios shown in the tables below, were added to the container in an appropriate sequence to allow mixing while limiting the heat or shear degradation of ingredients. After the ingredients in the container were completely melted and mixed thoroughly to allow a good visual homogeneity, samples were stored appropriately to be tested.

Laminated specimens were formed by using a high speed laboratory coater, at 800 feet per minute. When a spiral spray technique was used, the coater was fitted with a conventional 0.018-inch to 0.020-inch diameter spiral spray extrusion nozzle, with 12 air holes, available from Nordson Corporation. When Surewrap® technique was used, the coater was fitted with a 3-strands 0.01 8 inch diameter extrusion nozzle available from Nordson Corporation. Adhesives were sprayed at various coating weights, depending on the application required, with different open times—typically 0.05 to 0.1 seconds—to the 1-bar-nip rolls compression.

Standard polypropylene-based spun-bond non-woven web is available from BBA Corporation at 15.7 gram per square meter coating weight. Standard polyethylene non-breathable treated and embossed white film at 17 gram per square meter is available under trade name DH-216 from Clopay Corporation. Standard spandex strands are available from Invista, under the Trademark Lycra XA, and the grade used is 262P, at 800 decitex.

When spiral spray is used, the spray head is generally perpendicular to the substrate and at a height between 0.5 and 1 inch to get a 12 to 14 mm wide pattern into the laminated structure, covering 3 parallel strands of Lycra material with 5 mm in-between them.

Creep Resistance or bond retention test is carried out with the laminated specimens containing elastic strands. The specimen, cut to about 300 mm in length, is stretched out completely and its ends were securely attached to a piece of rigid board. A length of 200 mm was marked in the machine direction and the elastic strands are cut at the marks. The specimen is then placed in an air-circulating oven at 100° F. Under these conditions, the stretched elastic strands can retract or contract to a certain distance. The distance between the ends of each elastic strand is measured after four hours. The ratio of the final length to the initial length, defined as bond Retention and expressed in percentage (%), is a measure of the ability of the adhesive to hold the elastic strands. This ratio is measured on 8 to 12 elastic strands and the result is then averaged. If this test is performed within 2 days after the adhesive coating has been done, it is called the initial creep test. If it is performed after the specimen have been put in an oven at 60° C. one week after the coating operation, this test is called the one-week-aged creep test.

The procedure for performing the Creep Test is as follows:

Background: The elastic at a certain elongation (250% or 300% stretched) is sandwiched in between two (2) substrates (primary and secondary substrates) using an adhesive to form a laminate.

Purpose: This test is to measure the movement of elastic or "creep," from the primary and secondary substrates.

Procedure:
A. Using the staple, secure one end of the laminate into the corrugated board. Stretch out the laminate to the full extension, making sure not to overstretch the lamination. Then, secure the other end of the laminate.
B. Using the ruler, mark across the elastic a length of approximately 300 mm.
C. Once all of the samples are secured and marked, cut with a razor across each of the strands of elastic.
D. Place the test samples into the oven, usually set at 100° F., and test. The samples should be checked after 4 hours. Mark the ends of each elastic strand and measure the % Creep Retention or % Creep.
E. Laminate samples are aged at elevated temperature (>100° F.) for 1 Week (or longer) to determine the % Creep Retention over time. Laminates are conditioned overnight at room temperature prior to testing.

Calculations:

Initial Laminate = 300 mm

Laminate after 4 hours = 250 mm $$\% \text{ Creep Retention} = \frac{\text{Length of laminantion after} \times \text{hours}}{\text{Length of initial lamination}} \times 100\%$$

$$\% \text{ Creep Retention} = \frac{250 \text{ mm}}{300 \text{ mm}} \times 100\%$$

% Creep Retention = 83.0%

Following raw materials have been used in the various compositions shown in examples:

NYNAS 222B is a naphthenic oil available from Nynas Corporation.

SUKOREZ SU-120 is a fully hydrogenated hydrocarbon-tackifying resin with a softening point of about 120° C., available from Kolon Chemical.

ESCOREZ 5600, 5615 and 5637 are all hydrogenated polycyclic aromatic-modified aliphatic tackifying resins with softening points respectively of about 100° C., about 115° C., and about 130° C., available from Exxon Mobil Chemicals.

IRGANOX 1010 is a hindered phenol type of antioxidant obtained from Ciba-Specialty Chemicals, Tarryton, N.Y.

H20006 is a commercial SIS-based hot melt adhesive for elastic attachment applications, available from Bostik, Inc.

H2669 is a commercial SIS-based hot melt adhesive for pad attachment applications, available from Bostik, Inc.

H20037-01 is a commercial SIS-based hot melt adhesive for skin attachment applications, available from Bostik, Inc.

Piccolyte HM 106 is a styrenated terpene tackifying resins having a softening point of about 105° C. available from Pinova Chemical.

PLASTOLYN 140 is a fully aromatic hydrocarbon resin with a softening point of about 140° C. available from Eastman Chemical.

SEPTON S4044 is a styrene ethylene/ethylene propylene styrene block copolymer (SEEPS) containing 32 percent styrene available from Septon Company of America. The solution viscosity at 10 percent in toluene at 30° C. is 460 mPa-s and 22 mPa-s at 5 percent.

SEPTON S4055 is a styrene ethylene/ethylene propylene styrene block copolymer (SEEPS) containing 30 percent styrene available from Septon Company of America. The solution viscosity at 10 percent in toluene at 30° C. is 5800 mPa-s and 90 mPa-s at 5 percent.

SEPTON S4077 is a styrene ethylene/ethylene propylene styrene block copolymer (SEEPS) containing 30 percent styrene available from Septon Company of America. The solution viscosity at 5 percent in toluene at 30° C. is 300 mPa-s.

"HC" as used herein is an abbreviation for "hydrocarbon."

"SB" as used herein is an abbreviation for "styrene-butadiene."

"SIBS" as used herein is an abbreviation for "styrene-isoprene-butadiene-styrene."

"SEBS" as used herein is an abbreviation for "styrene-ethylene-butadiene-styrene."

"SEP" as used herein is an abbreviation for "styrene-ethylene-propylene."

"SEPS" as used herein is an abbreviation for "styrene-ethylene-propylene-styrene."

"SBBS" as used herein is an abbreviation for "styrene-butadiene-butadiene-styrene."

The invention is further illustrated by way of the specific examples that are set forth below.

Example 1

Table 1 illustrates two different compositions prepared according to the present invention and compares them to a commercially available SIS-based hot melt adhesive for elastic attachment applications. Table 1 illustrates the initial creep resistance results of the compositions described when the adhesive add-on is 10 gsm, in spiral spray configuration, respectively. Table 1 also shows the one-week-aged creep test results. From these results, it is clear that the two formulas are suitable to fulfill the requirements the present invention has described.

TABLE 1

|  |  | EXAMPLE 1 | H20006-SIS |
| --- | --- | --- | --- |
| Nyplast 222B | Mineral oil | 26.5 |  |
| Sukorez SU120 | Hydrogenated Hydrocarbon resin | 53.0 |  |
| Plastolyn 140 | Aromatic Endblock resin | 10.0 |  |
| SEEPS S4044 | 32% Styrene-SEEPS | 10.0 |  |
| Irganox 100 | Antioxidant | 0.5 |  |
|  | Total (%) | 100 |  |

TABLE 1-continued

|  |  | EXAMPLE 1 | H20006-SIS |
|---|---|---|---|
| Creep Retention Performance,/ 100° F., 10 GSM add-on | Initial | 81% | 86% |
|  | 1 Week @ 130° F. | 84% | 79% |

Example 2

Table 2a illustrates four different compositions prepared according to the present invention and compares them to a commercially available SIS-based hot melt adhesive for elastic attachment applications. Table 2b illustrates the initial creep test results of the compositions described in Table 2a when the adhesive add-on is 10 gsm, in wrapped or spiral spray configuration. Table 2c shows the initial and the one-week-aged peel strengths of the compositions with an adhesive add-on of 4 gsm when used in a construction application using polyethylene film and nonwoven substrates. From these results, it is clear that the four formulas are suitable to fulfill the requirements the present invention has described.

TABLE 2a

|  | Nynas 222B | Escorez 5615 | Septon4077 | Irganox 1010 | Total (wt %) |
|---|---|---|---|---|---|
| SEEPS-2B | 29.5 | 65 | 5 | 0.5 | 100 |
| SEEPS-5B | 34.5 | 60 | 5 | 0.5 | 100 |
| SEEPS-8B | 36.5 | 57.5 | 5.5 | 0.5 | 100 |
| SEEPS-9B | 33.5 | 59.5 | 6.5 | 0.5 | 100 |

TABLE 2b

SEEPS Results

|  | Viscosity | | Softening Point | % Creep Retention,/ 100° F., 10 gsm add-on | |
|---|---|---|---|---|---|
|  | 300° F. | 325° F. |  |  | Average |
| SEEPS-2B | 10000 cPs | 4900 cPs | 228° F. | Initial | 85% |
|  |  |  |  | 1 Week @130° F. | 78% |
| SEEPS-5B | 6950 cPs | 3425 cPs | 225° F. | Initial | 69% |
|  |  |  |  | 1 Week @130° F. | 64% |
| SEEPS-8B | 8900 cPs | 4500 cPs | 235° F. | Initial | 59% |
|  |  |  |  | 1 Week @130° F. | 58% |
| SEEPS-9B | 25840 cPs | 11800 cPs | 246° F. | Initial | 63% |
|  |  |  |  | 1 Week @130° F. | 61% |
| H20006 | 15000 cPs | 7500 cPs | 230° F. | Initial | 86% |
|  |  |  |  | 1 Week @130° F. | 79% |

TABLE 2c

SEEPS Construction Application Results

|  | Adhesive Temp | 180 Degree. Peel (4 gsm add-on, 1 spiral) | |
|---|---|---|---|
| SEEPS-2B | 330° F. | Initial | 32 |
|  |  | 1 Week @ 130° F. | 19 |
| SEEPS-5B | 310° F. | Initial | 64 |
|  |  | 1 Week @ 130° F. | 27 |
| SEEPS-8B | 310° F. | Initial | 68 |
|  |  | 1 Week @ 130° F. | 62 |
| SEEPS-9B | 310° F. | Initial | 74 |
|  |  | 1 Week @ 130° F. | 46 |
| H20006 | 300° F. | Initial | 113 |
|  |  | 1 Week @ 130° F. | 196 |

Example 3

Table 3 illustrates seventeen different compositions prepared according to the present invention, containing different tackifying resin fractions and oil loadings. Table 3 illustrates the initial percent creep retention of the compositions described in Table 3 when coated at various temperatures, when the adhesive add-on is 10 gsm, in spiral spray configuration. From these results, it is clear that the 17 formulas are suitable to fulfill the requirements the present invention has described.

TABLE 3

|  | Nyplast 222B | Sukorez 130 | HM106 | Plastolyn 140 | SEEPS 4044 | Viscosity @325° F. | S.P. | % Creep Retention |
|---|---|---|---|---|---|---|---|---|
| j60-1 | 28 | 30 | 20 | 10 | 12 | 26000 | 250 | 57 |
| j60-2 | 35 | 20 | 23 | 10 | 12 | 14000 | 237 |  |
| j60-3 | 30.3 | 30 | 22.7 | 5 | 12 | 13420 | 243 | 48 |
| j60-4 | 25 | 30 | 30 | 7 | 8 | 3845 | 223 |  |
| j60-5 | 30.2 | 25.2 | 25.2 | 7.5 | 12 | 16620 | 244 | 48 |
| j60-6 | 35 | 20 | 27 | 10 | 8 | 2315 | 219 | 35 |
| J60-7 | 34.3 | 20 | 30 | 5 | 10.7 | 5825 | 237 | 35 |
| j60-8 | 35 | 30 | 22 | 5 | 8 | 1950 | 213 |  |
| j60-9 | 32 | 30 | 20 | 10 | 8 | 3055 | 218 | 45 |
| j60-10 | 31 | 26 | 30 | 5 | 8 | 2320 | 212 |  |
| j60-11 | 35 | 25.7 | 20 | 10 | 9.3 | 4637 | 227 | 35 |
| j60-12 | 29.3 | 20 | 30 | 10 | 10.7 | 2050 | 241 | 52 |
| j60-13 | 25 | 30 | 28 | 5 | 12 | 11000 | 238 | 63 |
| j60-14 | 35 | 28 | 20 | 5 | 12 | 9900 | 235 |  |
| j60-15 | 25 | 23 | 30 | 10 | 12 | 28600 | 252 | 56 |
| j60-16 | 25 | 30 | 25.7 | 10 | 9.3 | 8450 | 227 |  |
| j60-17 | 35 | 20 | 23 | 10 | 12 | 14000 | 237 |  |

Example 4

Table 4 illustrates two different compositions prepared according to the present invention, containing different polymer blends. Table 4 illustrates the % creep retention initially, and after one week, for the compositions described in Table 4, when the adhesive add-on is 10 gsm, in spray configuration. From these results, it is clear that the two formulas are suitable to fulfill the requirements the present invention as described.

TABLE 4

POLYMER BLENDS

| | | 1636-121-1 | 1636-121-4 |
|---|---|---|---|
| Nyplast 222B | Mineral Oil | 26.5 | 26.5 |
| Sukorez 120 | Hydrogenated HC resin | 53.0 | 53.0 |
| Excorez 5615 | Aromatic-modified aliphatic HC resin | 10.0 | — |
| Plastolyn 140 | Aromatic Endblock resin | — | 10.0 |
| Septon 4044 | SEEPS | 5.0 | 5.0 |
| Septon 2063 | SEPS | 5.0 | — |
| Kraton G-1657 | SEBS | — | 5.0 |
| Irganoz 1010 | Antioxidant | 0.5 | 0.5 |
| | Total (%) | 100 | 100 |
| Physical Properties | Viscosity @ 325° F. | 2945 cPs | 3080 cPs |
| | Soft. Point | 209° F. | 207° F. |
| % Creep Retention/ 100° F., 10 gsm add-on | Initial | 67% | 70% |
| | 1 Week @ 130° F. | 50% | 55% |

Example 5

Table 5 illustrates a composition prepared according to the present invention, for use in a pad attachment for sanitary napkins as compared to a commercially available SIS-based adhesive, when the adhesive add-on is 20 gsm, in slot coat configuration. Table 5 shows the peel strength data for the two compositions. From these results, it is clear that the formula 1636-1 is suitable to fulfill the requirements the present invention as described and function as a pad attachment adhesive.

TABLE 5

PAD ATTACHMENT FOR SANITARY NAPKINS

| | | 1636-1 | H2669 |
|---|---|---|---|
| Nyplast 222B | Mineral Oil | 31.50 | |
| Escorez 5600 | Aromatic-modified aliphatic HC resin | 60.00 | |
| Septon 4044 | SEEPS | 8.0 | |
| Irganox 1010 | Antioxidant | 0.5 | |
| | Total (%) | 100 | |
| Physical Properties | Viscosity @ 325° F. | 1530 cPs | 1675 cPs |
| | Soft. Point | 186° F. | 200° F. |
| 180 Degree Peel, 20 gsm add-on, 1.0 inch width slot coat | In Use Test On Cotton Fabric | 109 grams/inch | 145 grams/inch |
| | Transfer Test On Cotton Fabric | 382 grams/inch | 346 grams/inch |

Example 6

Table 6 illustrates a composition prepared according to the present invention, for use in a skin attachment application, as compared to a commercially available SIS-based adhesive, when the adhesive add-on is 24 gsm, in slot coat configuration. Table 6 shows the peel strength data for the two compositions. From these results, it is clear that the formula 1636-100-1 is suitable to fulfill the requirements the present invention as described, and function as an adhesive in skin attachment applications.

TABLE 6

SKIN ATTACHMENT APPLICATIONS

| | | 1636-100-1 | H20037-01 |
|---|---|---|---|
| Nyplast 222B | Mineral Oil | 34.5 | |
| Excorez 5600 | Aromatic-modified aliphatic HC resin | 53.0 | |
| Septon 4044 | SEEPS | 12.0 | |
| Irganox 1010 | Antioxidant | 0.5 | |
| | Total (%) | 100 | |
| Physical Properties | Viscosity @ 325° F. | 5862 cPs | 1460 cPs |
| | Soft. Point | 206° F. | 200° F. |
| 180 Degree Peel, 24 gsm add-on, 1.0 inch width slot coat | Initial @ 77° F. Stainless Steel Plate/Mylar film | 2.6 lbs/inch | 5.3 lbs/inch |
| | Initial @ 100° F. Stainless Steel Plate/Mylar film | 1.1 lbs/inch | |

Example 7

Table 7 illustrates a composition prepared according to the present invention, for use in tape and label applications. Table 7 shows the peel strength data for the composition. From these results, it is clear that the formula 1636-131-2 is suitable to fulfill the requirements the present invention as described, and function as an adhesive tape and label applications.

TABLE 7

TAPE & LABEL APPLICATIONS

| | | 1636-131-2 |
|---|---|---|
| Nyplast 222B | Mineral Oil | 34.5 |
| Sukorez 130 | Hydrogenated HC resin | 20.0 |
| Piccolyte HM 106 | Styrenated terpene resin | 23.0 |
| Plastolyn 140 | Aromatic Endblock resin | 10.0 |
| Septon 4044 | SEEPS | 12.0 |
| Irganox 1010 | Antioxidant | 0.5 |
| | Total (%) | 100 |
| Physical Properties | Viscosity @ 325° F. | 14000 cPs |
| | Soft. Point | 237° F. |
| 180 Degree Peel, 1.0 Mil add-on, 1.0 inch width slot coat | Initial @ 77° F. Stainless Steel Plate/Mylar film | 4.9 lbs/inch Adhesive Failure |
| | SAFT | 175° F. |

Example 8

Table 8 illustrates another composition prepared according to the present invention, for use in construction applications. Table 8 shows the initial and 1 week peel strength data for the composition. From these results, it is clear that the formula is suitable to fulfill the requirements the present invention as described, and function as an adhesive in construction applications.

TABLE 8

CONSTRUCTION APPLICATIONS

|  |  | 1636-1 |
|---|---|---|
| Nyplast 222B | Mineral Oil | 31.50 |
| Escorez 5600 | Aromatic-modified aliphatic HC esin | 60.0 |
| Septon 4044 | SEEPS | 8.0 |
| Irganox 1010 | Antioxidant | 0.5 |
|  | Total (%) | 100 |
| Physical Properties | Viscosity | 1530 cPs @ 325° F. |
|  | Soft. Point | 186° F. (in Glycerin) |
| 180 Degree Peel, 4 gsm add-on, 1 spiral pattern | Initial PE/NW | 80 grams/1 spiral |
|  | 1 Week at 130° F. PE/NW | 74 grams/1 spiral |

The invention claimed is:

1. A hot melt adhesive composition, comprising a blend of the following components:
   about 1% to about 20% by weight of a styrene-ethylene-ethylene-propylene-styrene random block copolymer;
   about 10% to about 70% by weight of a first midblock tackifying resin having a softening point of about 85° C. to about 125° C.;
   about 0% to about 65% by weight of a second midblock tackifying resin;
   about 5% to about 60% by weight of a plasticizer; and
   about 0% to about 20% by weight of an end block reinforcing resin having a softening point equal to or higher than 115° C.;
   wherein the components total 100% by weight of the composition, and the viscosity of the composition is equal to or less than about 20,000 mPa·s at 160° C.

2. The composition of claim 1 comprising about 4% to about 15% by weight of said random block copolymer.

3. The composition of claim 1 comprising about 5% to about 13% by weight of said random block copolymer.

4. The composition of claim 1 comprising at least 25% by weight of said plasticizer.

5. The composition of claim 1 wherein said random block copolymer has a styrene content of from about 30% to about 32% by weight.

6. The composition of claim 1 wherein said first midblock resin has a softening point of from about 95° C. to about 115° C.

7. The composition of claim 1 wherein said composition has a viscosity equal to or less than 15,000 mPa·s at 160° C.

8. The composition of claim 1 wherein said composition has a viscosity equal to or less than 12,000 mPa·s at 160° C.

9. The composition of claim 1 comprising about 2% to about 15% of said end block reinforcing resin.

10. The composition of claim 1 wherein the end-block reinforcing resin is a product from pure monomer polymerization.

11. The composition of claim 1 wherein the end-block reinforcing resin has a softening point of from about 115° C. to about 160° C.

12. The composition of claim 1 wherein the end-block reinforcing resin has a softening point of from about 115° C. to about 140° C.

13. The composition of claim 1 wherein the end-block reinforcing resin has a softening point of from about 120° C. to about 140° C.

14. The composition of claim 1 having about 40% to about 65% by weight of said first midblock tackifying resin.

15. The composition of claim 1 having about 50% to about 60% by weight of said first midblock tackifying resin.

16. The composition of claim 1 wherein said composition has an initial bond retention of at least about 70%.

17. The composition of claim 1 wherein said composition has an initial bond retention of at least about 75%.

18. The composition of claim 1 wherein said composition has an initial bond retention of at least about 80%.

19. The composition of claim 1 further having a one-week-aged bond retention of at least about 50%.

20. The composition of claim 1 further having a one-week-aged bond retention of at least about 60%.

21. The composition of claim 1 further having a one-week-aged bond retention of at least about 70%.

22. The composition of claim 1 wherein the mid-block tackifying resin is selected from the group consisting of aliphatic hydrocarbon resins and their hydrogenated derivatives, hydrogenated cycloaliphatic hydrocarbon resins, aromatic modified aliphatic or hydrogenated cycloaliphatic hydrocarbon resins, aliphatic modified aromatic hydrocarbon resins, partially or fully hydrogenated aromatic hydrocarbon resins, polyterpene and styrenated polyterpene resins.

23. The composition of claim 1 wherein said plasticizer is selected from the group consisting of mineral oil and liquid polybutene.

24. The composition of claim 1 wherein further including a wax selected from the group consisting of petroleum waxes, microcrystalline waxes, low molecular weight polyethylene and polypropylene, synthetic waxes and polyolefin waxes.

* * * * *